(12) United States Patent
Grant et al.

(10) Patent No.: US 7,447,637 B1
(45) Date of Patent: Nov. 4, 2008

(54) SYSTEM AND METHOD OF PROCESSING SPEECH WITHIN A GRAPHIC USER INTERFACE

(75) Inventors: Richard Grant, Davie, FL (US); Pedro McGregor, Miami, FL (US)

(73) Assignee: Eastern Investments, LLC, Vero Beach, FL (US)

( * ) Notice: Subject to any disclaimer, the term of this patent is extended or adjusted under 35 U.S.C. 154(b) by 0 days.

(21) Appl. No.: 11/681,449

(22) Filed: Mar. 2, 2007

Related U.S. Application Data

(63) Continuation of application No. 10/619,204, filed on Jul. 14, 2003, now Pat. No. 7,188,067, which is a continuation of application No. 09/804,164, filed on Mar. 12, 2001, now Pat. No. 6,606,599, which is a continuation of application No. 09/219,916, filed on Dec. 23, 1998, now Pat. No. 6,208,972.

(51) Int. Cl.
*G10L 21/00* (2006.01)

(52) U.S. Cl. ............... 704/275; 704/270; 704/257; 704/251; 704/231

(58) Field of Classification Search ......... 704/270–275, 704/251, 231, 277, 260, 257
See application file for complete search history.

(56) References Cited

U.S. PATENT DOCUMENTS

| | | | | |
|---|---|---|---|---|
| 5,761,641 A | * | 6/1998 | Rozak et al. | 704/275 |
| 5,864,815 A | * | 1/1999 | Rozak et al. | 704/275 |
| 6,138,098 A | * | 10/2000 | Shieber et al. | 704/257 |
| 6,138,100 A | * | 10/2000 | Dutton et al. | 704/275 |
| 6,208,972 B1 | * | 3/2001 | Grant et al. | 704/275 |
| 6,801,897 B2 | * | 10/2004 | Kist et al. | 704/275 |
| 6,965,863 B1 | * | 11/2005 | Zuberec et al. | 704/270 |

* cited by examiner

*Primary Examiner*—Vijay B Chawan
(74) *Attorney, Agent, or Firm*—Milde & Hoffberg LLP

(57) ABSTRACT

According to the present invention, a method for integrating processes with a multi-faceted human centered interface is provided. The interface is facilitated to implement a hands free, voice driven environment to control processes and applications. A natural language model is used to parse voice initiated commands and data, and to route those voice initiated inputs to the required applications or processes. The use of an intelligent context based parser allows the system to intelligently determine what processes are required to complete a task which is initiated using natural language. A single window environment provides an interface which is comfortable to the user by preventing the occurrence of distracting windows from appearing. The single window has a plurality of facets which allow distinct viewing areas. Each facet has an independent process routing its outputs thereto. As other processes are activated, each facet can reshape itself to bring a new process into one of the viewing areas. All activated processes are executed simultaneously to provide true multi-tasking.

22 Claims, 9 Drawing Sheets

SYSTEM AND METHOD OF PROCESSING SPEECH WITHIN A GRAPHIC USER INTERFACE

RELATED APPLICATIONS

The present application is a continuation of U.S. patent application Ser. No. 10/619,204, now U.S. Pat. No. 7,188,067, which is a continuation of U.S. patent application Ser. No. 09/804,164, now U.S. Pat. No. 6,606,599, which is a continuation of U.S. patent application Ser. No. 09/219,916, now U.S. Pat. No. 6,208,972, each of which is expressly incorporated herein by reference.

BACKGROUND OF THE INVENTION

The present invention relates to a method for controlling a series of processes with a human centered interface. More precisely, the present invention relates to integrating a plurality of processes into a common user interface which is controlled by voice activated commands. The method further includes a common framework which allows hands-free control of each process within the framework. A multitude of processes can be easily integrated into the common framework. All processes which are controlled in the common framework can be executed in a multitasking environment.

Recent advances in computer technology has prompted an expansion in the use of personal computers for both business and home use. The widespread use of personal computers has lead to a migration away from central based computing on mainframes to distributed computing on personal computers. Business applications often share common databases and system utilities across an interoffice network. With the growth in the use of the internet, distributed computing models have become increasingly important. By distributing the resources necessary to accomplish a given task, the amount of data required to be transferred across a network can be reduced.

The desire to distribute processing and databases has produced an industry of object based programming architectures and languages. The proliferation of programming architectures/languages such as Java, Active X, C++, COM, OpenDoc and CORBA are a testament to this increased interest in distributed computing. Many prior art software designs have been implemented on personal computers based on these object oriented programming models.

The Common Request Broker Architecture (CORBA) provides an object based programming architecture which operates under a client/server topology. In a CORBA based application program, every task is handled as an object which is a self contained program. An Object Request Broker (ORB) serves as a mechanism for communicating client requests to target objects. Client requests appear as local procedure calls. When a client invokes an operation, the ORB finds the object, sends a request to the object and once the object completes the request returns any responses to the client. Each object operates independent of one another within the system.

In each object based programming model it is common for each executing object to "pop-up" a "window" when any type of input or output (I/O) access is required by the user. When an object is executing a request, focus (an active attention within its window) is granted to the object. Object oriented systems running on personal computers are generally limited to a single active focus to a single object (within it's window) at any given time.

Object based programming architectures like CORBA provide very complex standards with which to work. A programmer must adhere to very stringent programming requirements in order to follow the CORBA standard. In order to allow multiple objects to be used together, CORBA uses a scripting language which queues objects in a sequence. A CORBA architecture does not permit parameter passing directly between objects and requires all parameters to pass through the common request broker.

Current computer technology allows application programs to execute their procedures within individual process oriented graphical user interfaces (i.e. a "window"). Each process is encapsulated in such a manner that all services required by the process are generally contained within the encapsulated process. Thus each object is an entity unto itself. Each process generally contains all of its own I/O within its own operating window. When a process requires I/O, such as a keyboard input, mouse input or the like, the operating system passes the input data to the application or object. It is conventionally known that a process window (a parent window) spawns a child window when the application calls for specific data entry (I/O). This presents certain problems in that the child window does not release focus from the child window until the child window is terminated. When a keyboard and mouse are used as the primary interface, the keyboard and mouse control will maintain focus in the child window as long as the child window is active. The viewing area becomes cluttered with child windows and it is difficult to read and parse all the information on the computer screen.

Current voice driven software technology is useful for little more than a dictation system which types what is spoken on a display screen. Although many programs have attempted to initiate command sequences, this involves an extensive training session to teach the computer how to handle specific words. Since those words are not maintained in a context based model that is intelligent, it is easy to confuse such voice command systems. In addition, the systems are limited in capability to the few applications that support the voice interface.

One program, which was designed by the present inventor, allows for voice activated commands to control a user interface. This program (sold under the name VOICE PILOT®) contains a voice interface which allows for voice initiated execution of programs as well as recording dictation. However, the overall architecture of this program requires the use of child/parent windows as previously discussed. Every voice initiated application maintains its own operating window as a "child window" of the parent process. The child window has to be satiated before releasing control (active focus) and returning I/O access back to the main program.

The child/parent window configuration does not allow for complex command processing. A complex command requires more than one process be performed in a specific order based on a single spoken command phrase. For Example, the spoken command phrase "add Bob to address book" is a multiple-step/multiple-process command. The appropriate commands required by the prior art are: "open address book", "new entry" and "name Bob". In the prior art, each operation is required to be completed one by one in a sequential order. Although this methodology works to a minimum satisfaction level, it does not use natural language speech. The prior art is not capable of performing multiple step operations with a single spoken command phrase.

In addition, the prior art does not provide that a single spoken command phrase causes multiple processes to be executed at the same time. For example, the spoken command phrase "Write a letter to Bob" requires multiple processes to be executed in order to effectuate the command. The prior art would have to do the following: "open address book", "select Bob", "copy address", "open editor", "new letter" and "paste address". The address book and text editor/word processor are generally different applications. Since these programs require the data to be organized in a specific order, the voice commands must be performed in a specific order to achieve the desired result. The prior art is not capable of performing operations simultaneously across multiple applications with a single spoken command phrase.

Current computer technologies are not well suited for use with a voice driven interface. The use of parent and child windows creates a multitude of problems since natural language modeling is best handled with complex command processing. Since child windows receive active focus as a single window, they tend to sequentially process simple (single process) voice commands.

The current invention seeks to overcome these limitations by providing a uniform speech aware interface that is optimized for a hands free, voice driven environment. This is especially useful for contact management, business professionals and anyone looking to eliminate the time wasting procedure of pushing and shoving windows around a video screen to find the useful data buried therein. By utilizing a voice interface, an innovative natural language processor and a unique graphical user interface which supports true multi-tasking, and I/O access which eliminates the use of "child" windows, the limitations of the prior art are overcome.

OBJECTS AND SUMMARY OF THE INVENTION

It is an object of the present invention to overcome the drawbacks in the prior art.

It is an object of the present invention to provide a method of processing information using a hands free voice activated environment.

It is a further object of the present invention to provide a universal access method to enable processes to connect to a common user interface.

It is yet a further object of the present invention to provide a voice driven environment to control access to multiple processes.

It is another object of the present invention to provide a method of parsing voice initiated utterances to establish context based decision making.

It is another object of the present invention to provide a method of processing voice entered information by determining if command and data elements are present within a phrase of the information.

Briefly stated the present invention provides a method for integrating processes with a multi-faceted human centered interface is provided. The interface is facilitated to implement a hands free, voice driven environment to control processes and applications. A natural language model is used to parse voice initiated commands and data, and to route those voice initiated inputs to the required applications or processes. The use of an intelligent context based parser allows the system to intelligently determine what processes are required to complete a task which is initiated using natural language. A single window environment provides an interface which is comfortable to the user by preventing the occurrence of distracting windows from appearing. The single window has a plurality of facets which allow distinct viewing areas. Each facet has an independent process routing its outputs thereto. As other processes are activated, each facet can reshape itself to bring a new process into one of the viewing areas. All activated processes are executed simultaneously to provide true multi-tasking.

According to an aspect of the invention, there is provided for a method for controlling a plurality of processes by voice actuated grammars initiated by a user, each grammar having at least one phoneme, the steps comprising: receiving an initial grammar from a process in response to the user initiating an utterance, setting a command mode of operation when the initial grammar from the step of receiving is determined to be a command activation statement, cycling through a first loop when in the command mode of operation, under control of the first loop: receiving a data stream from the process, the data stream containing at least one grammar, storing the data stream in a data storage location such that each the at least one grammar is in a separate location of the data storage location, searching the data storage location for a valid command statement, setting an error condition when the step of searching does not find the valid command statement, processing the valid command statement when the step of searching finds the valid command statement, the valid command statement corresponding to at least one of the plurality of processes, and setting the mode of operation to a wait mode of operation when the step of processing the valid command statement is completed.

According to another aspect of the invention, there is provided for a method for controlling a plurality of processes by voice actuated grammars initiated by a user, each grammar having at least one phoneme, the steps comprising: receiving an initial grammar from a process in response to the user initiating an utterance, the process including a speech-to-text processor, setting a command mode of operation when the initial grammar from the step of receiving is determined to be a command activation statement, cycling through a first loop when in the command mode of operation, under control of the first loop: receiving a data stream from the process, the data stream containing at least one grammar, storing the data stream in a data storage location such that each the at least one grammar is in a separate location of the data storage location, searching the data storage location for a valid command statement, the step of searching includes comparing each the at least one grammar to a known vocabulary table, the vocabulary table containing a list of system commands and application commands which are registered in a process registration database, setting an error condition when the step of searching does not find the valid command statement, processing the valid command statement when the step of searching finds the valid command statement, the valid command statement corresponding to at least one of the plurality of processes, and setting the mode of operation to a wait mode of operation when the step of processing the valid command statement is completed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

FIGS. 1-9 contain a detailed flow chart for a multi-faceted human centered interface (MFHCI) designed according to the present invention. For convenience, every process step is designated with a process step identifier containing a letter 'S' followed by a three digit number (i.e. S300). Each process step ("Sxyz") uses a numbering convention where the three digit code ("xyz") corresponds to the figure with which the process step relates. In every process step designated as "Sx00", the "x" digit corresponds to the figure number in which the detail of the procedure is shown. In each figure there is an end of process block which is designated as a "return" statement. Every "return" process step is designated as "Sxy0", where "x" refers to which figure number to return to, and "y" refers to the current figure number. In all other process steps, the "x" refers to the current figure, and "yz" refers to a unique process step number which is none zero. The convention used to designate process steps will become apparent from the discussion which follows.

Figure 1:
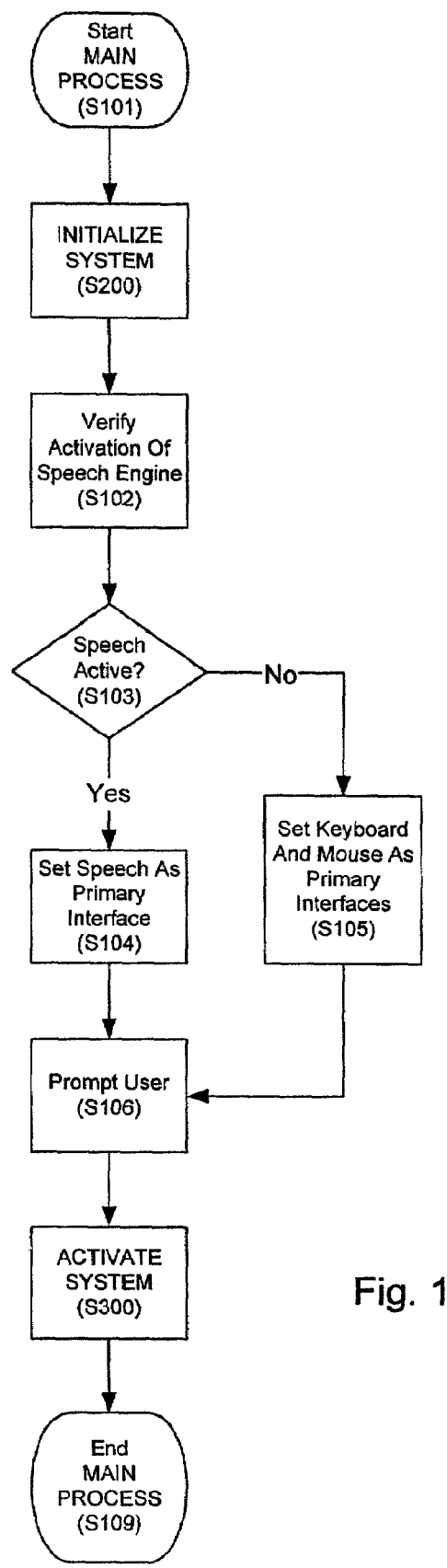
FIG. 1 is a general block diagram showing the flow of processes in a Multi-Faceted Human Centered Graphical Interface system according to the present invention.

Referring to FIG. 1, there is shown a general block diagram for a multi-faceted human centered interface (MFHCI). The MFHCI functions as a universal human interface to allow enhanced access and usability to task management. By parsing a series of voice initiated utterances, a series of command sequences are identified and tasks are queued from the MFHCI. The voice initiated utterances can be any type of phoneme (the smallest unit of speech that distinguishes one sound from another), word or phrase in any language. In an alternative embodiment, a series of keyboard inputs can be used to initiate the command sequence. In a preferred embodiment of the invention, hands free voice initiated commands control the execution of processes, facilitate managing multiple tasks simultaneously and allows voice control of all applications.

The MFHCI is started by initiating a start command. The start command can be generated by speaking an utterance into a voice input device, striking a key on a keyboard, clicking a mouse input device on an icon, or any other known method of initiating execution of a sequence of instructions. Once the start command is initiated, a main process (S101, FIG. 1) is executed by the MFHCI. The main process: initializes a series of parameters (S200, FIG. 2), verifies the speech engine is active (S102-103) and sets the primary interface to be speech or defaults to keyboard and mouse based upon the speech engine being active (S104 S105), prompts the user that the system is active (S106) and activates the system to accept all data I/O through the system (S300).

Figure 2:
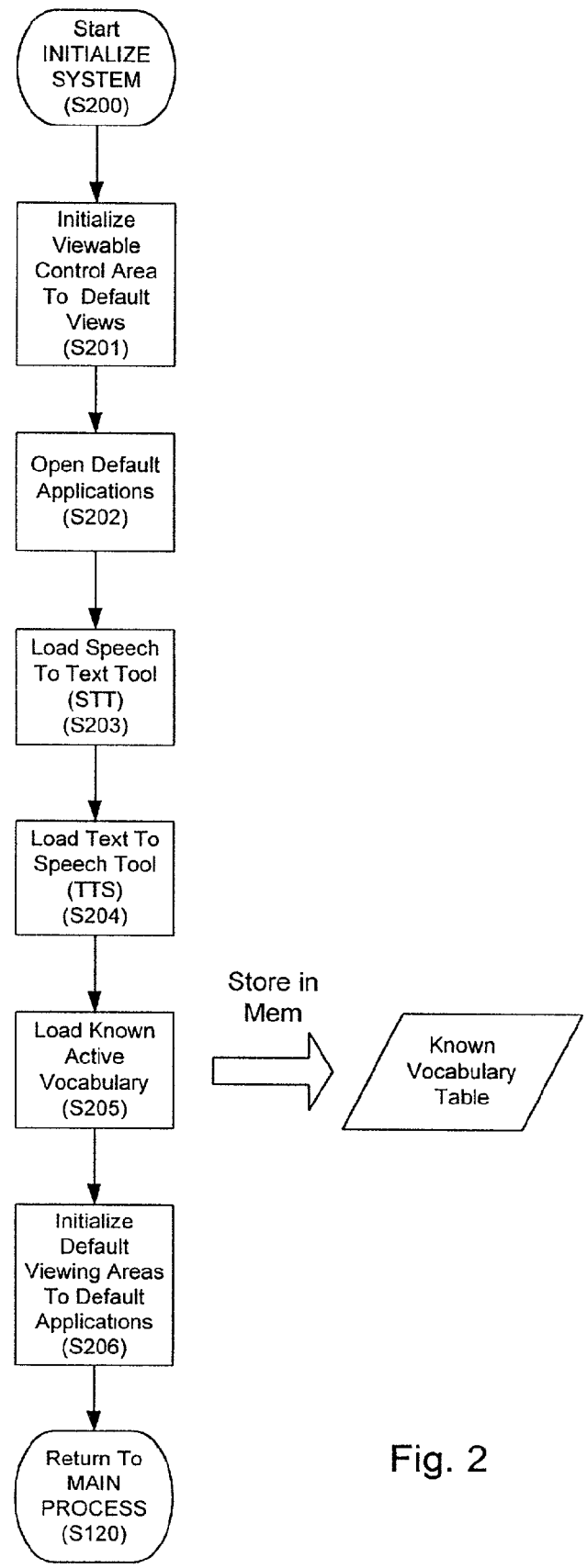
FIG. 2 is a flow diagram showing a detail of the Initialize System step from FIG. 1.

Referring to FIG. 2, a detail of the MFHCI initialization sequence (S200) is shown. This includes setting up a display screen area (S201), opening a series of previously designated default applications (S202), loading a speech to text (STT) translation engine into the system (S203), loading a text to speech (TTS) translation engine into the system (S204), loading an active application dictionary (AAD) into a memory table (S205) and initializing the default applications to the default viewing areas of the display (S206). Once the initialization sequence ends (S120), program control is returned back to the Main process in FIG. 1.

It is important to note that there is only one "windowed" area of the display. The active viewing areas are all maintained within the confines of the single display area. Even when applications/processes are activated subsequently, the viewing area changes but no additional window areas ever appear. Moreover, once an application is activated it remains active even when subsequent applications are activated. This permits a true multitasking environment that is optimized for voice applications.

The above initialization sequence (S200-S206) sets the display screen area to multiple active viewing areas (called facets). Each default application corresponds to one facet of the display area. The output of the processes used by the application are directed to each applications corresponding facet. In a preferred embodiment of the invention, the display screen contains three active facets corresponding to left, top and bottom portions of the display screen. Although it is understood that any number of facets (display portions of the view screen) can be utilized, it is preferred to use three facets at a time. The human brain can easily handle three facets at a time without taxing the users. An excessive number of facets creates a cluttered confusion to the user. Likewise, the prior art methods are difficult for users to deal with because parent/child screens appear one on top of another, creating an obscured, cluttered look to the screens. In the present invention, each screen portion corresponds to one of the active facets, which are all part of a single "windowed" environment.

Referring again to FIG. 1, after the system is initialized in step S200, the system verifies that the speech mode is active (S102-104). This can be done, for example, by checking to see if a microphone is present on the system and recognizable, and if no microphone can be found then the system disables the speech interface. When the speech engine is disabled the keyboard and mouse function as the primary input device to the MFHCI (S105). The keyboard and mouse are always active as secondary input devices when the speech interface is the primary interface.

Figure 3:
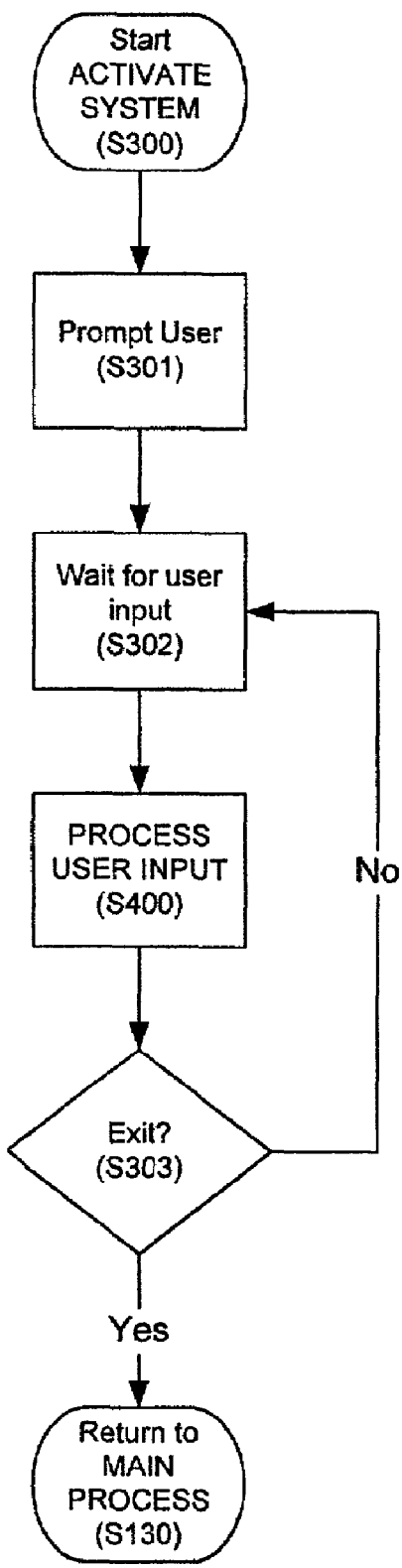
FIG. 3 is a flow diagram showing a detail of the Activate System step from FIG. 1.

Once all the initialization parameters are set in place, the system prompts the user (S106, FIG. 1) and goes into an active mode (S300, FIG. 3). The prompt can be any graphical/audio/visual prompt that is desired. For example, the TTS engine can be used by the system to announce a greeting. After the greeting/prompting has been made, the MFHCI system is active. The MFHCI system is running at all times. The voice/primary interface is actively monitored for possible commands, requests or data input. Even when the system is in the middle of doing another process, the primary interface is being polled continuously for commands.

FIG. 3 shows a flow chart depicting the process flow where the system has been activated by a user (S300). First, the user is prompted for input (S301). This prompting is not a general greeting as in step S106 but instead is a request for user input. This request can be in the form of any graphical, audio or visual cue which is necessary to alert the user that the system expects an input. The system waits for the user to generate an input (S302). The user generated input can be derived from any acceptable input process including, but not limited to an STT engine, a keyboard, a mouse or the like. Once an input is supplied, the MFHCI system processes the input (S400, see FIG. 4 for details) and checks to see if the input is a command to exit the system (S303). When the input is a request to exit the system (i.e. "Quit"), the main process terminates (S130)

and control returns back to the main process in FIG. 1. Having received a request to exit, the main process is subsequently terminated (S109).

Figure 4:
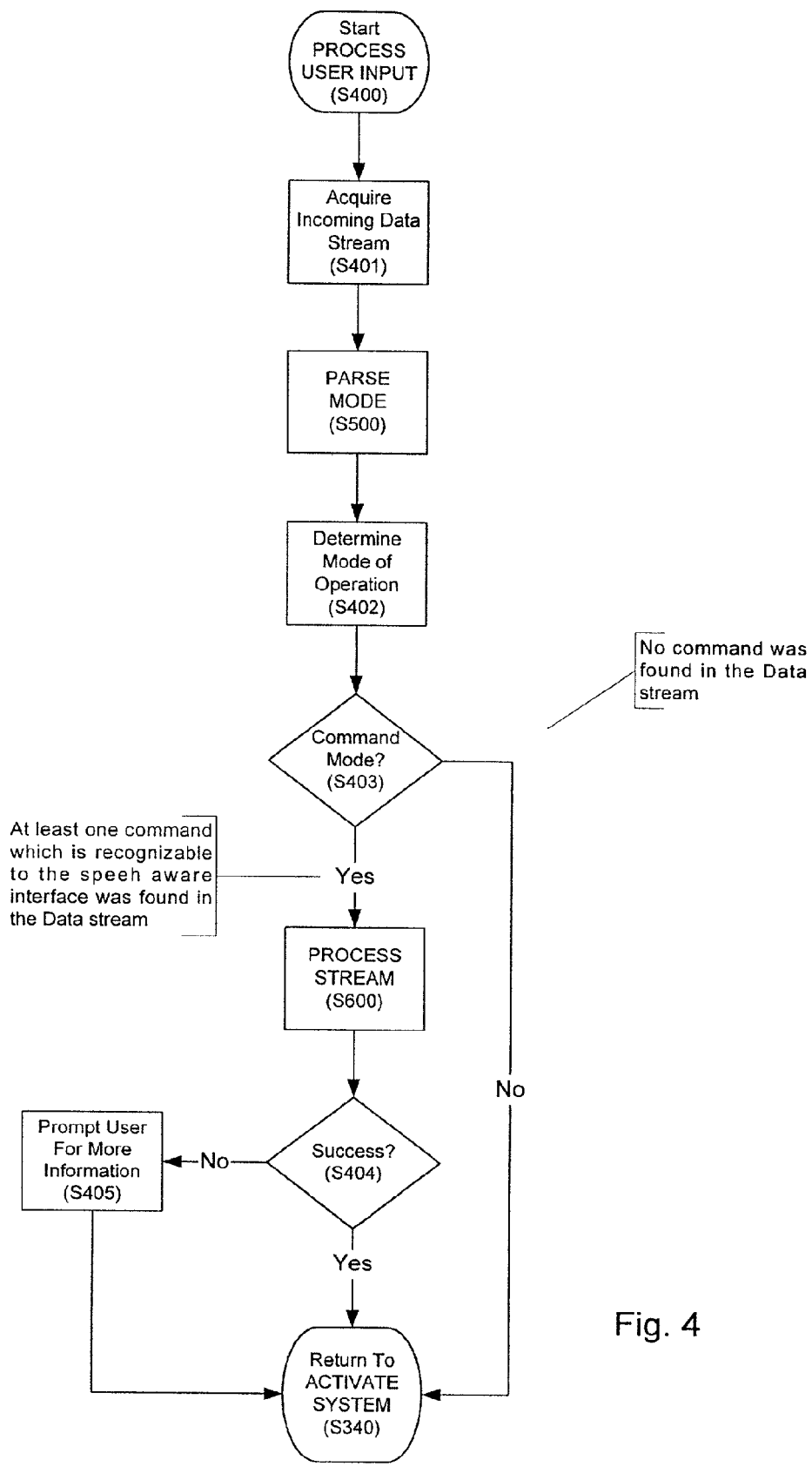
FIG. 4 is a flow diagram showing a detail of the Process User Input step from FIG. 3.

The general manner in which user input is processed is depicted in the flow chart found in FIG. 4. As shown in FIG. 4, an input is processed (S400) by acquiring the data out of a data stream (S401) and parsing that data elements to determine what operating mode the data stream requires for that data to be acted upon (S500, FIG. 5). The data stream can be found in a memory queue, a memory address, a register, an operating system pipe, a shared memory area, on a hard disk drive or any other means of passing data from an outside resource into a program. In instances where the system has been integrated together with the input stream processing program (i.e. a voice to text driver) the data stream can be passed directly into the MFHCI as an internal resource. In any case, the data elements which are received from the input data stream corresponds to the data which is being supplied by the primary interface (i.e. the microphone driving the STT engine piping data out in text). The data is parsed to determine the mode of operation (S402). When it is determined that the data stream requires a command mode in order to be processed: the command mode is initiated (S403), the system processes the data stream (S600, details found in FIG. 6), the system checks to see if the data stream was successfully processed (S404), and if unsuccessful the system prompts the user for more information (S405). When no command mode was initiated (S403) or upon completion of processing the data stream, the system terminates the processing of user input (S340) and returns to the Wait mode (S302, FIG. 3) or possibly exits the process (S303) as in FIG. 3.

Figure 5:
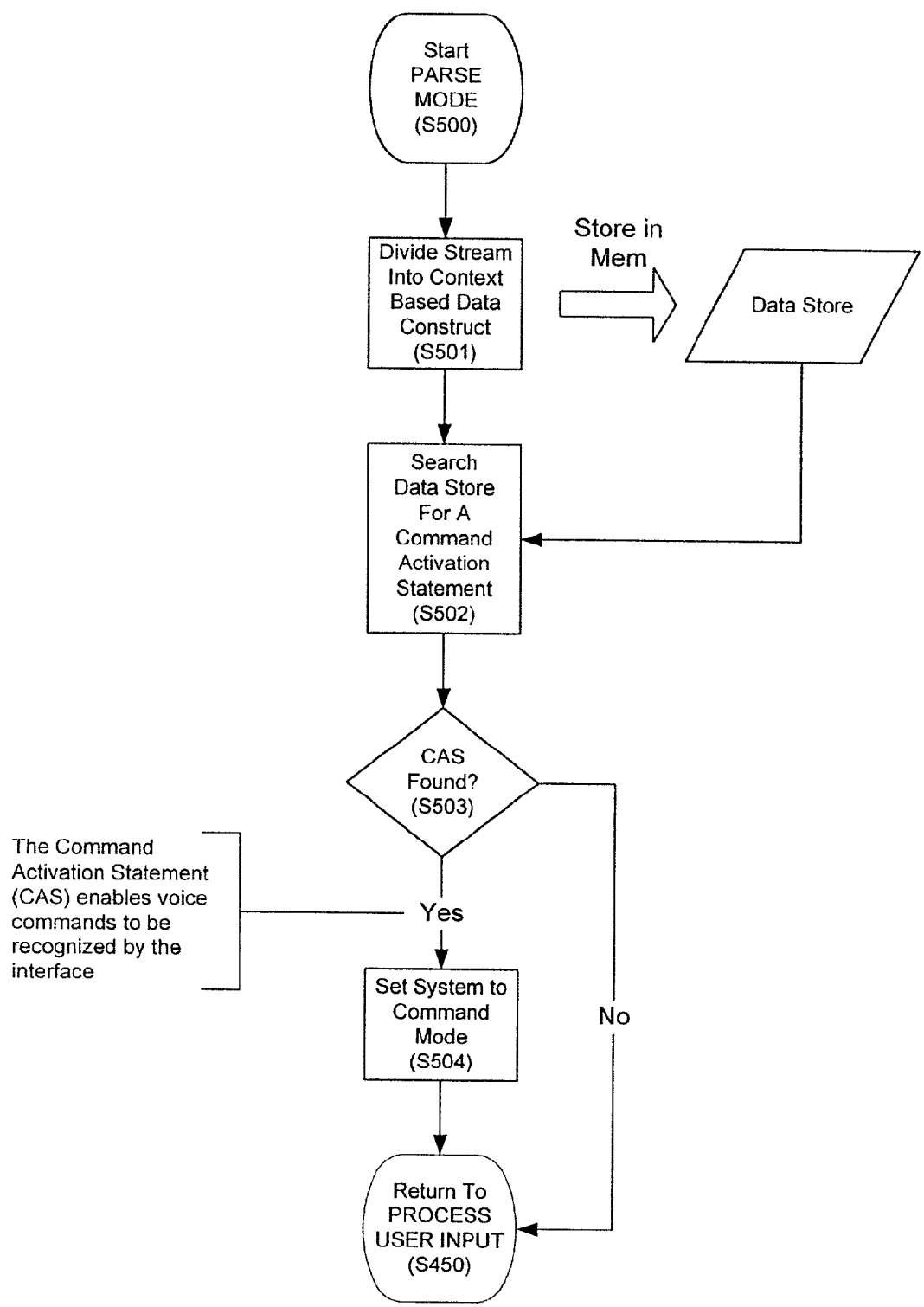
FIG. 5 is a flow diagram showing a detail of the Parse Mode step from FIG. 4.

FIG. 5 shows a flow chart depicting the parsing of an input data stream in order to determine if the system needs to be in the command mode (S500). The stream is first divided into a series of grammars which place the phrases in a context based data structure (S501) which is stored in a data store memory. The data store is searched for a Command Activation Statement (CAS). When a CAS is found in the data store (S503), the system is set into command mode (S504), otherwise the system defaults into a non-command mode.

A CAS is a unique word/phrase/keystroke or the like which alerts the system that a user has an instruction waiting for service. In a preferred embodiment the user speaks a unique word into the computer microphone which alerts the computer that commands will follow hereafter. For Example, the computer can be named, when the name of the computer is spoken in a context which is unique (i.e. a pause, followed by "HAL", followed by a pause) then in that context, the system knows that it has been alerted of the CAS. Similarly, a unique phrase can indicate a CAS (i.e. the spoken phrase "Activate Voice"). Once the CAS is uttered, the system goes into an active mode. It is important to note that the CAS can be contained in a dialog where notes are being recorded that are unrelated to the activation of the system (i.e. "Hal needs a new modem"). In instances where the context is unrelated to the activation command, the computer will not mistake this for a CAS. By reviewing the locus of words around a possible CAS, context is determined and an appropriate action is taken.

Figure 6:
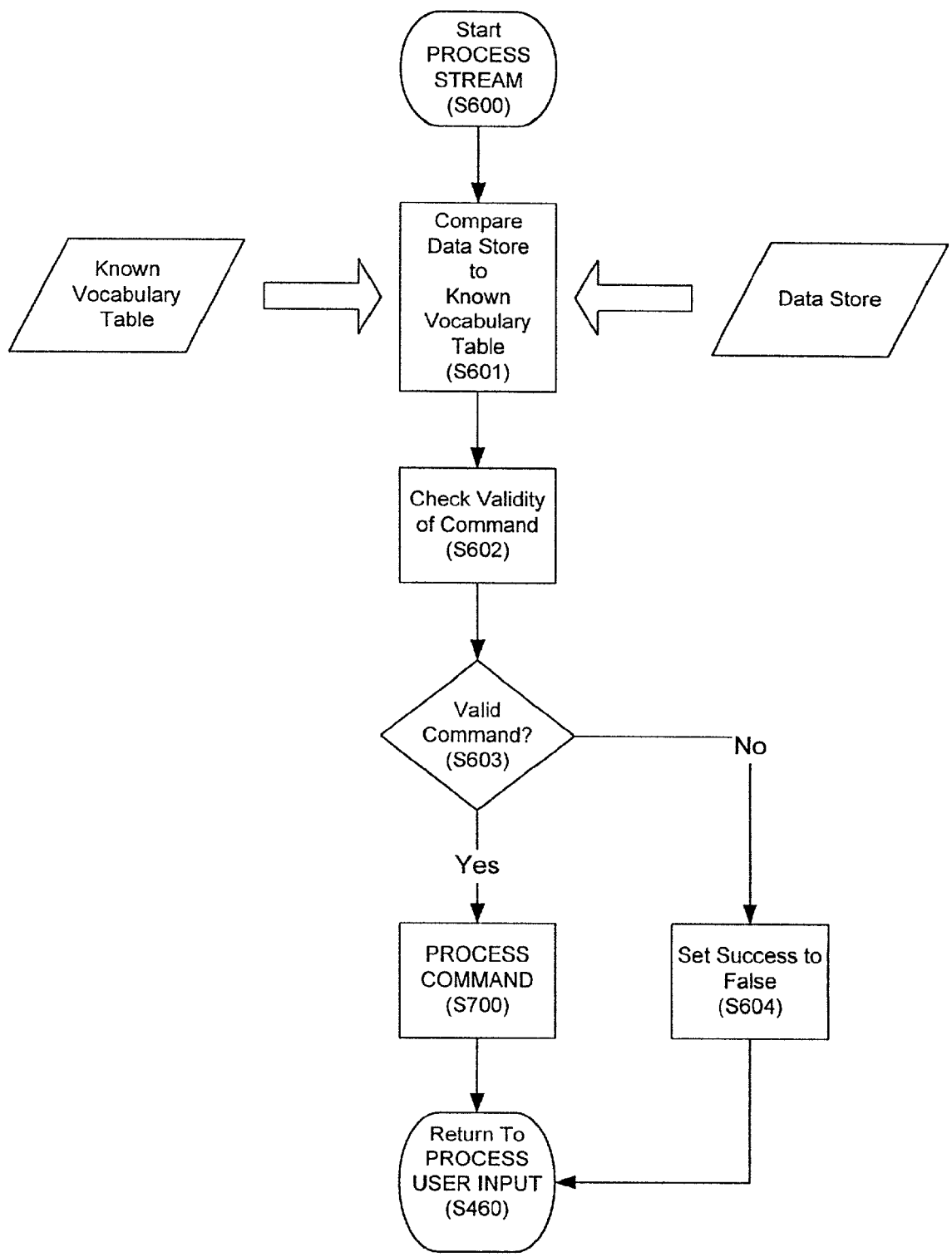
FIG. 6 is a flow diagram showing a detail of the Process Stream step from FIG. 5.

Once the system enters the command mode (S403 in FIG. 4), the system processes the incoming data stream (S600) as shown in FIG. 6. The vocabulary table, which was loaded during initialization, is compared to the data stream which is continually sent into the data store (S601). If the element in the data store is a valid command which is found in the vocabulary table (S602-603) then the system process the command (S700). If the element was not in the vocabulary table then it is deemed to not an invalid command statement, and the system sets the "success" flag to false (S604). Upon completion of the processing of the data stream, control is returned (S460) back to the Process User Input sequence shown in FIG. 4.

Figure 7:
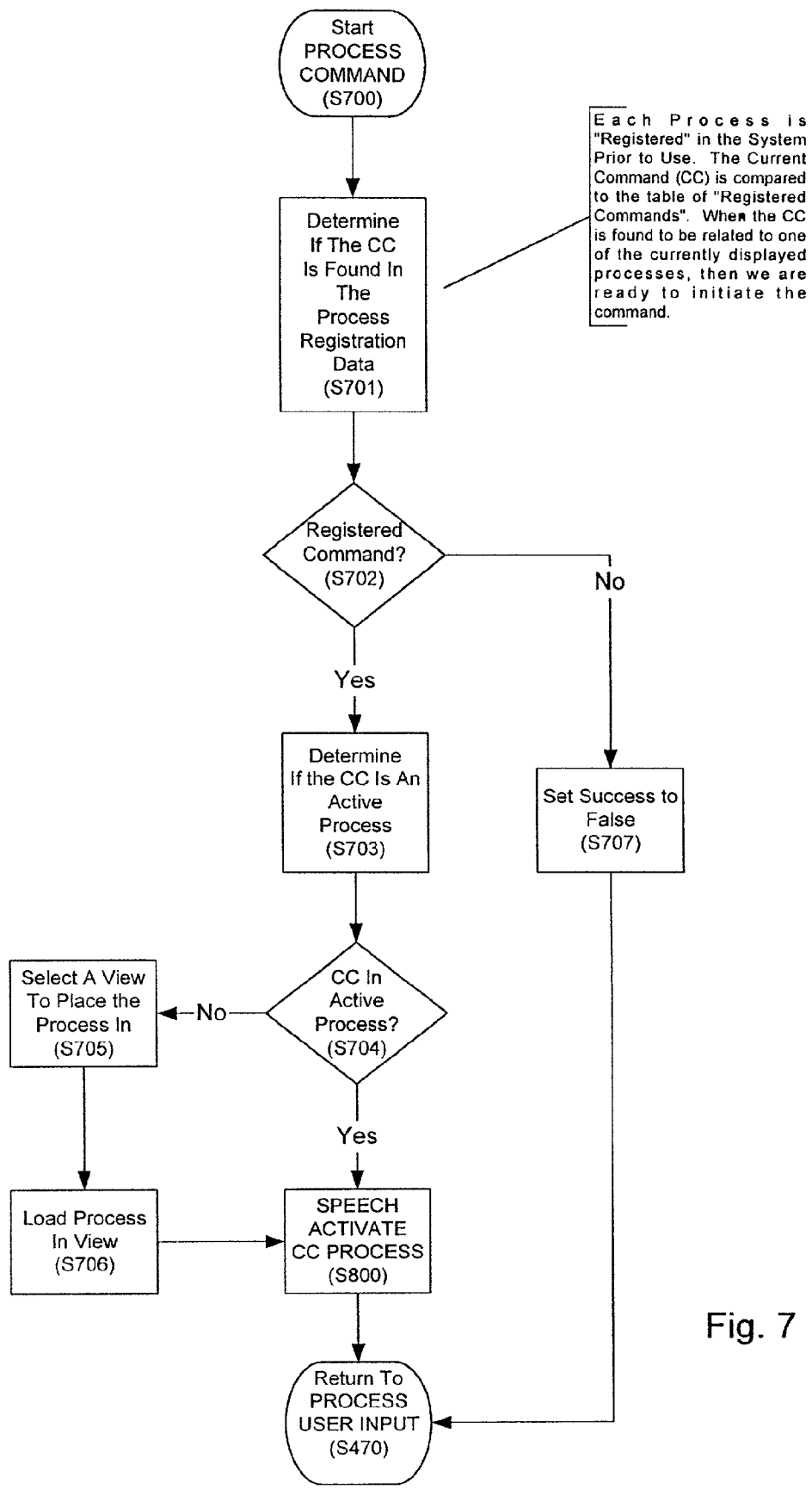
FIG. 7 is a flow diagram showing a detail of the Process Command step from FIG. 4.

Once the system has determined that a valid command is contained in the data stream (S603, FIG. 6) the command must be processed. In order to process a command (S700) the system must perform a series of tasks as shown in FIG. 7. The system compares the current command (CC) to a process registration table (not shown) in order to determine if the CC is part of a registered process (S701-702). All tasks (i.e. Application programs on a computer) that are controlled by the MFHCI must be registered in the system in order to be useable by the MFHCI. After an application is registered in the system, the application is "known" to the MFHCI. A registered application (RAP) is an application in which each and every functional element has been described to the MFHCI. When an application is registered, the MFHCI amends the Known Vocabulary Table to contain a complete vocabulary for each functional aspect of the RAP. The process registration also amends a known process table which cross-references applications/processes with known vocabularies in the table. Thus, a dictionary of all the vocabulary required for all "known" applications is constructed, and a relational database or table allows the MFHCI to identify the vocabularies with the corresponding processes, messages, events and methods.

For Example, one application which lends itself to voice commands is a telephone dialer program. During registration of the telephone dialer program, a series of words or phrases are registered with the MFHCI. The MFHCI amends the vocabulary table to contain the required vocabulary relevant to the telephone dialer program. Examples of the required vocabulary could be keywords and phrases such as: "dial", "call", "connect", "hang-up", "disconnect", "hold", "transfer", "forward", "redial" and the like. Once the vocabulary is contained in the table, the MFHCI will construct a relational table to identify those vocabularies with the telephone dialer program and all its functional features.

As shown in FIG. 7, after the CC has been determined to be a known vocabulary corresponding to a registered process, then the system determines if the CC is associated with a process which is already activated (S703-S704). When a CC is associated with an active process, the active process is set to one of the facets of the display and the facet is speech activated (S800). If a CC is associated with a process that is not active, the user is prompted to select a facet (viewing area within the single "window"), the process is loaded into memory, the process is associated with the selected facet and the facet is speech activated (S705, S706, S800). Once an application or process is loaded into memory, it is active even though it may or may not be attached to one of the facets. All applications that are activated remain active until terminated. Since the user dictates to the system, and the system locates the processes for the user, it is not necessary for the active process to be in the viewing area for it to be active. As the context of the user input changes from one process to another, the system dynamically "morphs" the facets of the display to accommodate what is needed to accomplish the task. By morphing the facet (dynamically changing the contents of the viewing area without effecting the surrounding viewing areas) the users concentration does not get broken up with a series of keystrokes, moving windows to free up space and the like.

The present invention grants a focus (an active attention) to the current facet which corresponds to the CCP when speech is activated with respect to this process. This is known as granting SPOCKUS (Speach Operational Control Kernal User Service) to the CCP. The CCP is enabled to interact with the Speech Aware Interface (SWI). All speech data that is streamed into the system is analyzed within the context of CCP (the SPOCKUS which has been directed to the CCP). Although the CCP is granted SPOCKUS, all facets and all processes are still known to the system to be active. Since all processes are still active, the SWI can "pipe" data to any one of the active processes if it is determined that the incoming data stream should be routed into a particular process.

Figure 8:
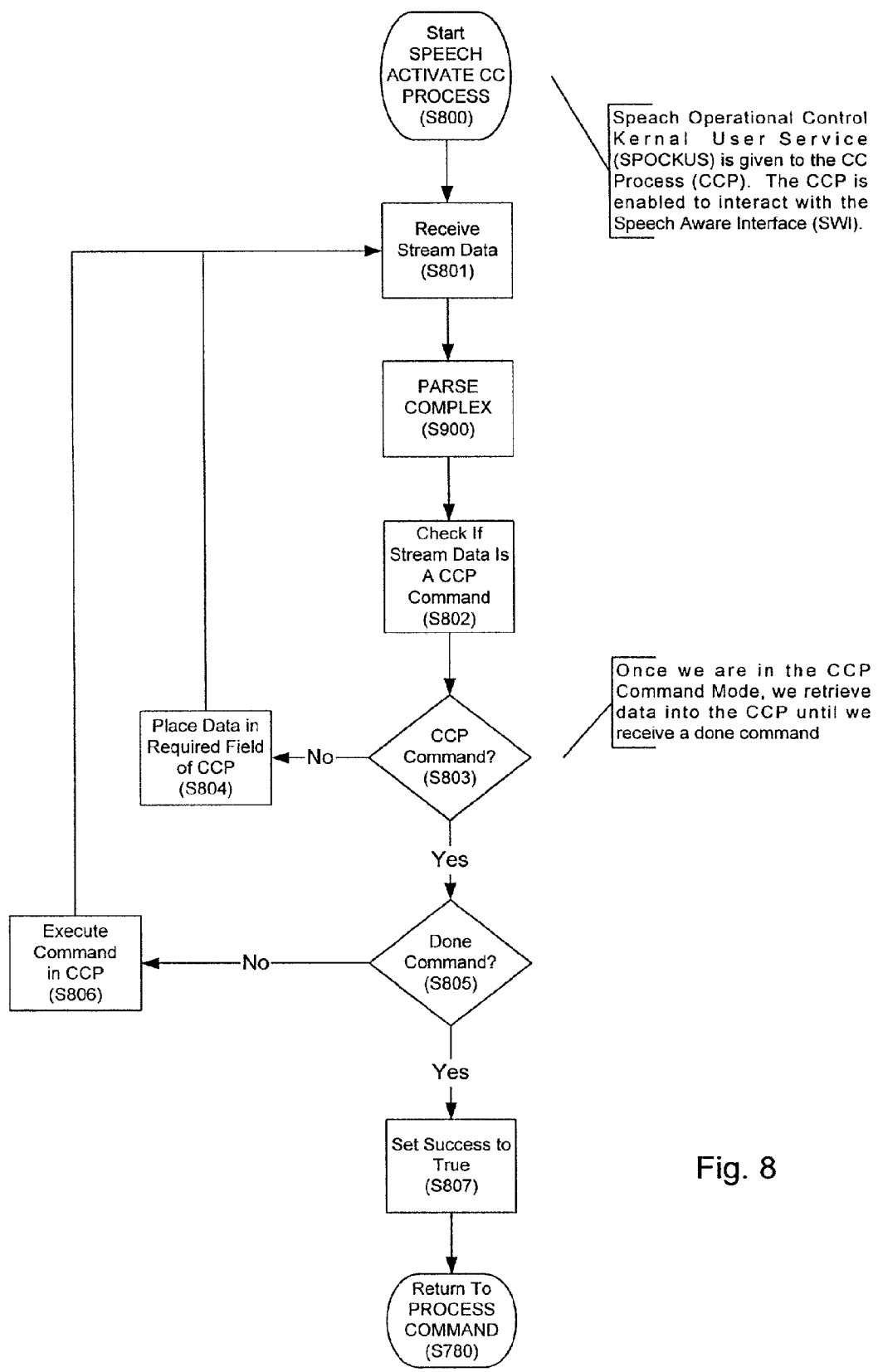
FIG. 8 is a flow diagram showing a detail of the Speech Activate Current Command Process step from FIG. 7

As shown in FIG. 8, the speech activated process receives streamed data (S801), parses the stream in Parse Complex process (S900) and determines if the streamed data is a CCP Command (S802). A CCP Command is a command that is known to the CCP that has been granted SPOCKUS. If the system doesn't identify a CCP command (S803-S804) then the system places the incoming stream in a buffer to be either discarded or placed in a data field of the current CCP, based on the context of the data. When a CCP command is identified by the system, the system determines (S805) if the command requires the process to terminate the process (i.e. "Done" or "Close File") or to execute a command in the CCP (S806). The system continuously processes the incoming data until it is instructed to terminate.

The analysis and parsing of the incoming data stream is related to the current command process. For example, a contact management program might be activated by uttering "Open the calendar and show me today's appointments". This utterance is parsed (divided up into application/computer related pieces) as a command to "open calendar" which initiates a CCP (the calendar process), and a command to "show appointments" which is a CCP command. "Today" is parsed as a data field for the CCP Command. As described above, the incoming data stream is analyzed to determine which process the stream should be routed to, opening the required application program if it is not currently active, and initiating a command which is recognizable by the contact manager which is now the current command process.

As discussed above, since all processes are still active, the SWI can "pipe" data to any one of the active processes. Thus, the system branches into other CPs without losing the current CP (CCP). Since the SWI is always active and monitoring the input data stream, the system can receive a command which is outside of the CCP. Upon receiving this command, the system activates another CCP, granting SPOCKUS to the new CCP, and executes the other process. When the subsequent process is terminated, the system returns SPOCKUS back to the previous CCP. The system can perform this recursive type of behavior over a plurality of CCPs.

Figure 9:
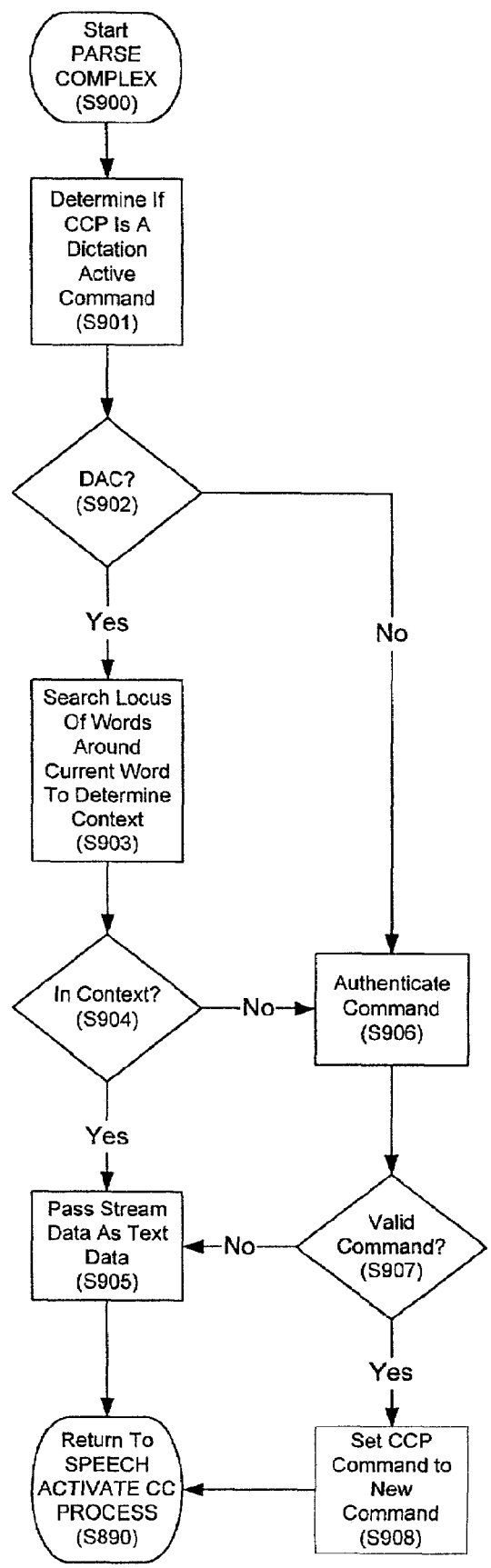
FIG. 9 is a flow diagram showing a detail of the Parse Complex step from FIG. 8.

Referring to FIGS. 8 and 9, each utterance received from the stream is parsed to determine the context and to refine the data elements using the Parse Complex (S900) procedure. If the CCP is a Dictation Active Command (DAC) then we must determine the context of the stream (i.e. a note taking program is active which receives dictation as its data elements). As shown in steps S901-S904, the incoming stream is parsed by checking the context of the adjacent words to the possible command word. A natural linguistic model is used to determine if the possible command word is within the scope of the adjacent words. The linguistic model is used to break apart verbs, nouns, adjectives etc. If the possible command word is within the scope of those words, then the command word is within the context of the dictation and the words are passed through as data elements (S905). If the possible command word is outside the scope of those words, then the command word is in fact a new command. We check the new command to determine if it relevant within the CCP. If the new command is authenticated then the new command is passed back to the Speech Activate CC Process (S890). Similarly, when we are not in the Dictation state (a non DAC Command is the CCP), the system authenticates the command as a new command, and passes it back to the Speech Activation process if it is valid (S902, S906-S908, S890).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech and analyzing a context-based data structure corresponding to the user communications to determine whether a valid command is present, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus, and wherein said speech processing module further selectively determines whether a user speech input is associated with a process executing within a facet, and if not displaying an executing process within a facet and otherwise activating the process and displaying said newly executed process within a facet.

2. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech and analyzing a context-based data structure corresponding to the user communications to determine whether a valid command is present, wherein a determination of whether a user speech input is intended as a command is dependent on a recognition of a command activation statement in the user speech input, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

3. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech and analyzing a context-based data structure corresponding to the user communications to determine whether a valid command is present, wherein the application of the predetermined grammar to validate the user speech input command comprises at least applying the user speech input to a grammar derived structure as it is received, and waiting until the grammar derived structure is fulfilled prior to passing the command for processing, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

4. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech and analyzing a context-based data structure corresponding to the user communications to determine whether a valid command is present, and in dependence thereon to at least selectively:

determine that a user speech input is intended as a command, apply a predetermined grammar to validate the user speech input command, and pass a validated command for processing thereof, wherein the application of the predetermined grammar to validate the user speech input command comprises at least applying the user speech input to the context based data structure as it is received, and prompting the user to provide required information for validation of the command, and determine that a user speech input is intended as a data input, and pass the user speech input to a process associated with the respective facet having focus.

5. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech, wherein said speech processing module stores a data stream representing the user speech input, which is then searched for an indication that the user speech input is intended as a command, and analyzing a context-based data structure corresponding to the user communications to determine whether a valid command is present, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

6. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech and analyzing a context-based data structure corresponding to the user communications to determine whether a valid command is present, wherein said speech processing module stores an indicator of whether a user speech input is intended as a command or intended as data, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

7. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module, wherein said speech processing module comprises a speech to text processor, adapted for receiving user communications as speech and analyzing a context-based data structure corresponding to the user communications to determine whether a valid command is present, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

8. A graphic user interface system, comprising:

a multi-tasking operating system;

a graphic user interface, supported by said multi-tasking operating system, supporting a plurality of concurrently active facets, and granting a focus to a respective facet based on a request relating to that facet, said focus indicating a target facet of received user communications;

a speech processing module adapted for receiving user communications as speech, wherein said speech processing module reads data from a registration database comprising a plurality grammars associated with respective available commands, and analyzing a context-based data structure corresponding to the user communications to determine whether a valid command is present, and in dependence thereon to at least selectively:

determine that a user speech input is intended as a command, apply a predetermined grammar to validate the user speech input command, and pass a validated command for processing thereof; and determine that a user speech input is intended as a data input, and pass the user speech input to a process associated with the respective facet having focus.

9. A graphic user interface system, comprising:
a multi-tasking operating system;
a graphic user interface, supported by said multi-tasking operating system, supporting a plurality of concurrently active facets, and granting a focus to a respective facet based on a request relating to that facet, said focus indicating a target facet of received user communications;
a speech processing module adapted for receiving user communications as speech and analyzing a context-based data structure corresponding to the user communications to determine whether a valid command is present, and in dependence thereon to at least selectively:
determine that a user speech input is intended as a command, apply a predetermined grammar to validate the user speech input command, wherein said speech processing module further distinguishes a target command processor for a user speech input intended as a command, and selectively passes a validated command to a respective one of a plurality of command processors in dependence thereon, for processing thereof; and
determine that a user speech input is intended as a data input, and pass the user speech input to a process associated with the respective facet having focus.

10. A graphic user interface system, comprising:
a multi-tasking operating system;
a graphic user interface, supported by said multi-tasking operating system, supporting a plurality of concurrently active facets, and granting a focus to a respective facet based on a request relating to that facet, said focus indicating a target facet of received user communications;
a speech processing module adapted for receiving user communications as speech and analyzing a context-based data structure corresponding to the user communications to determine whether a valid command is present, wherein said speech processing module reads data from a registration database comprising a plurality grammars associated with respective available commands, and determines a context based on at least a past user interaction, and in dependence thereon to at least selectively:
determine that a user speech input is intended as a command, apply a predetermined grammar to validate the user speech input command, and pass a validated command for processing thereof; and
determine that a user speech input is intended as a data input, and pass the user speech input to a process associated with the respective facet having focus.

11. A graphic user interface method, comprising:
providing a multi-tasking operating system having a graphic user interface, supporting a plurality of concurrently active facets, and granting a focus to a respective facet based on a request relating to that facet, said focus indicating a target facet of received user communications;
analyzing user speech input in accordance with a context based data structure to determine whether a valid command is present, and in dependence thereon at least selectively:
determining that a user speech input is intended as a command, apply a predetermined grammar to validate the user speech input command, and pass a validated command for processing thereof; and determining that a user speech input is intended as a data input, and pass the user speech input to a process associated with the respective facet having focus,
said determining further comprising selectively determining whether a user speech input is associated with a process executing within a facet, and if not, displaying an executing process within a facet, and otherwise, activating the process and displaying said process within a facet.

12. A computer readable medium, storing thereon computer readable instructions to cause a processor to execute said instructions for controlling said processor to perform the steps of claim 11.

13. A graphic user interface method, comprising:
providing a multi-tasking operating system having a graphic user interface, supporting a plurality of concurrently active facets, and granting a focus to a respective facet based on a request relating to that facet, said focus indicating a target facet of received user communications;
analyzing user speech input in accordance with a context based data structure to determine whether a valid command is present, comprising determining whether a user speech input is intended as a command, dependent on a recognition of a command activation statement in the user speech input; and in dependence thereon at least selectively:
determining that a user speech input is intended as a command, apply a predetermined grammar to validate the user speech input command, and pass a validated command for processing thereof; and
determining that a user speech input is intended as a data input, and pass the user speech input to a process associated with the respective facet having focus.

14. A computer readable medium, storing thereon computer readable instructions to cause a processor to execute said instructions for controlling said processor to perform the steps of claim 13.

15. A graphic user interface method, comprising:
providing a multi-tasking operating system having a graphic user interface, supporting a plurality of concurrently active facets, and granting a focus to a respective facet based on a request relating to that facet, said focus indicating a target facet of received user communications;
analyzing user speech input in accordance with a context based data structure to determine whether a valid command is present, and in dependence thereon at least selectively:
determining that a user speech input is intended as a command, apply a predetermined grammar to validate the user speech input command, and pass a validated command for processing thereof, wherein the application of the predetermined grammar to validate the user speech input command comprises at least applying the user speech input to a grammar derived structure as it is received, and waiting until the grammar derived structure is fulfilled prior to passing the command for processing; and
determining that a user speech input is intended as a data input, and pass the user speech input to a process associated with the respective facet having focus.

16. A computer readable medium, storing thereon computer readable instructions to cause a processor to execute said instructions for controlling said processor to perform the steps of claim 15.

17. A graphic user interface method, comprising:

providing a multi-tasking operating system having a graphic user interface, supporting a plurality of concurrently active facets, and granting a focus to a respective facet based on a request relating to that facet, said focus indicating a target facet of received user communications;

analyzing user speech input in accordance with a context based data structure to determine whether a valid command is present, wherein the application of the predetermined grammar to validate the user speech input command comprises at least applying the user speech input to the context based data structure as it is received, and prompting the user to provide required information for validation of the command, and in dependence thereon at least selectively:

determining that a user speech input is intended as a command, apply a predetermined grammar to validate the user speech input command, and pass a validated command for processing thereof; and determining that a user speech input is intended as a data input, and pass the user speech input to a process associated with the respective facet having focus.

18. A graphic user interface method, comprising:

providing a multi-tasking operating system having a graphic user interface, supporting a plurality of concurrently active facets, and granting a focus to a respective facet based on a request relating to that facet, said focus indicating a target facet of received user communications;

storing a data stream representing the user speech input, and then searching the stored data for an indication that the user speech input is intended as a command, in accordance with a context based data structure to determine whether a valid command is present, and in dependence thereon at least selectively:

determining that a user speech input is intended as a command, apply a predetermined grammar to validate the user speech input command, and pass a validated command for processing thereof;

determining that a user speech input is intended as a data input, and pass the user speech input to a process associated with the respective facet having focus.

19. A graphic user interface method, comprising:

providing a multi-tasking operating system having a graphic user interface, supporting a plurality of concurrently active facets, and granting a focus to a respective facet based on a request relating to that facet, said focus indicating a target facet of received user communications, and converting received speech into a text representation;

analyzing user speech input in accordance with a context based data structure to determine whether a valid command is present, and in dependence thereon at least selectively:

determining that a user speech input is intended as a command, apply a predetermined grammar to validate the user speech input command, and pass a validated command for processing thereof;

determining that a user speech input is intended as a data input, and passing the text representation of user speech input to a process associated with the respective facet having focus.

20. A computer readable medium, storing thereon computer readable instructions to cause a processor to execute said instructions for controlling said processor to perform the steps of claim 19.

21. A graphic user interface method, comprising:

providing a multi-tasking operating system having a graphic user interface, supporting a plurality of concurrently active facets, and granting a focus to a respective facet based on a request relating to that facet, said focus indicating a target facet of received user communications;

reading data from a registration database comprising a plurality grammars associated with respective available commands;

analyzing user speech input in accordance with a context based data structure to determine whether a valid command is present, and in dependence thereon at least selectively:

determining that a user speech input is intended as a command, apply a predetermined grammar to validate the user speech input command, and pass a validated command for processing thereof;

determining that a user speech input is intended as a data input, and pass the user speech input to a process associated with the respective facet having focus.

22. A graphic user interface method, comprising:

providing a multi-tasking operating system having a graphic user interface, supporting a plurality of concurrently active facets, and granting a focus to a respective facet based on a request relating to that facet, said focus indicating a target facet of received user communications;

analyzing user speech input in accordance with a context based data structure to determine whether a valid command is present, and in dependence thereon at least selectively:

determining that a user speech input is intended as a command, apply a predetermined grammar to validate the user speech input command, distinguishing one of a plurality of available command processors for a user speech input intended as a command, and selectively passing a validated command to a respective one of the plurality of available command processors for processing thereof in dependence thereon;

determining that a user speech input is intended as a data input, and pass the user speech input to a process associated with the respective facet having focus.

* * * * *